(No Model.) 2 Sheets—Sheet 1.
L. APPERT.
MANUFACTURE OF HOLLOW GLASS ARTICLES.
No. 507,400. Patented Oct. 24, 1893.
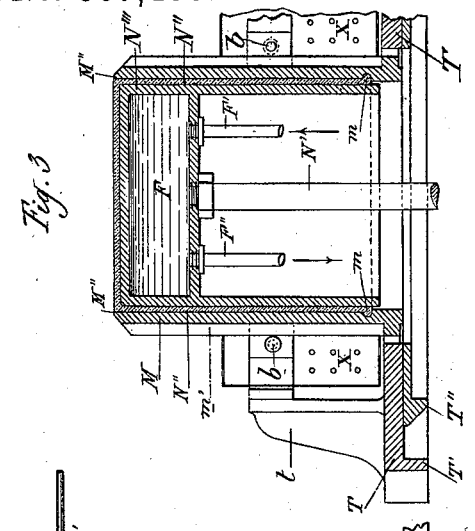
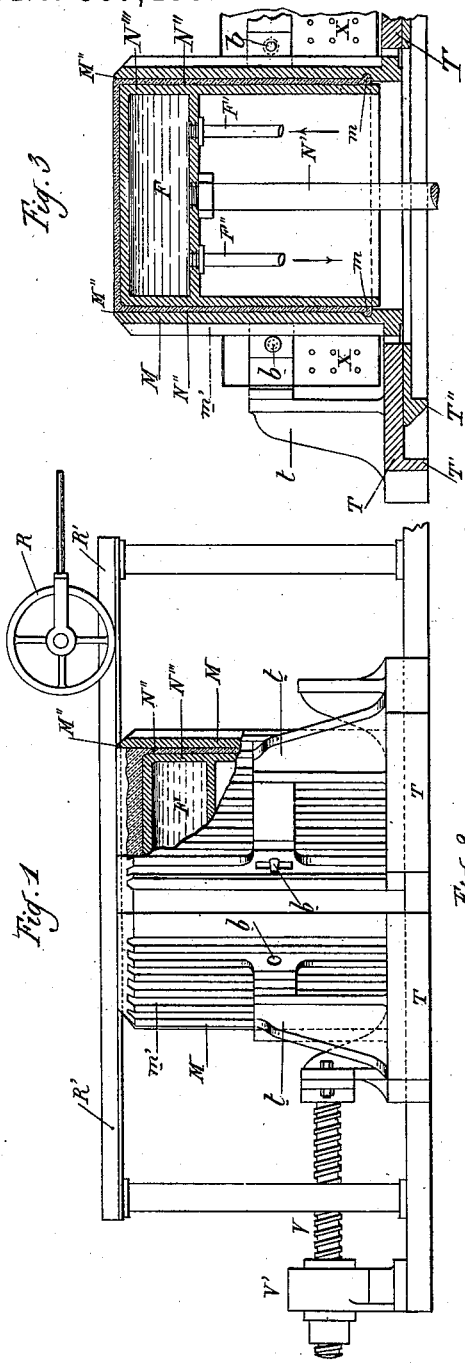
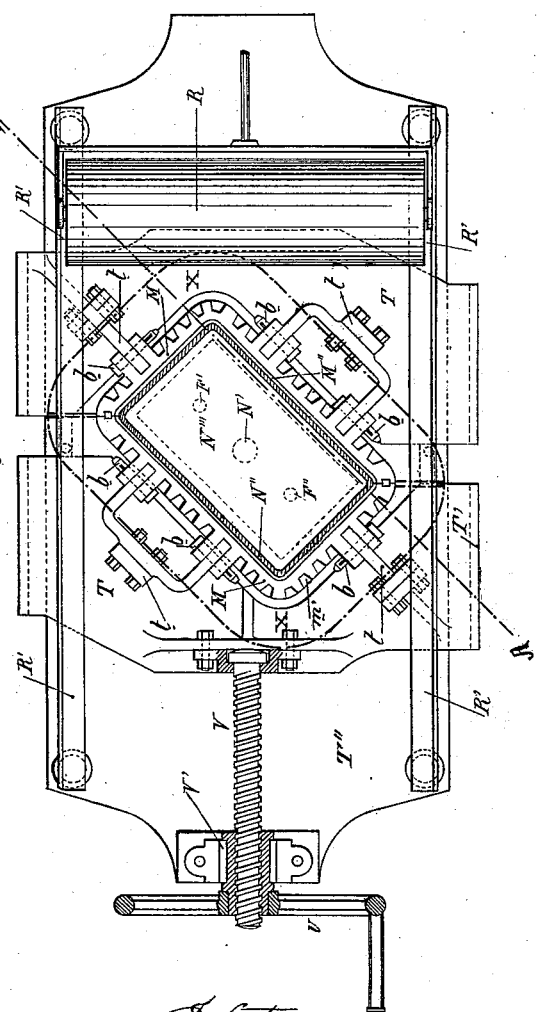

(No Model.) 2 Sheets—Sheet 2.
L. APPERT.
MANUFACTURE OF HOLLOW GLASS ARTICLES.
No. 507,400. Patented Oct. 24, 1893.
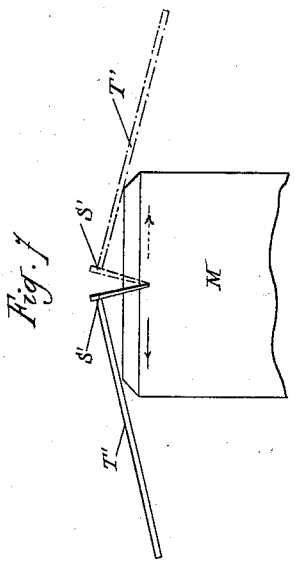
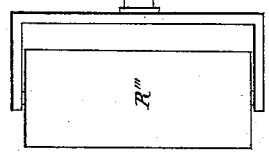
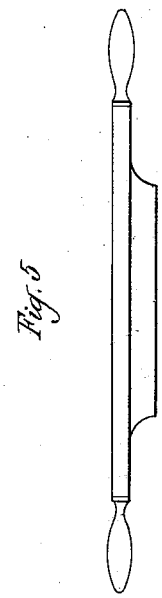
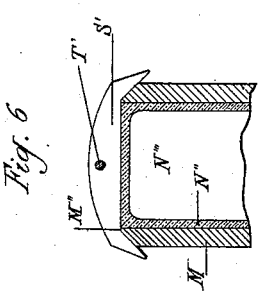
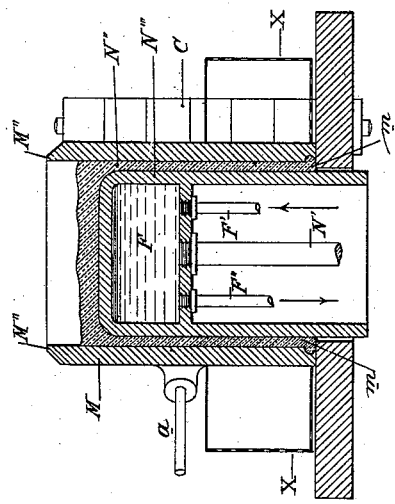
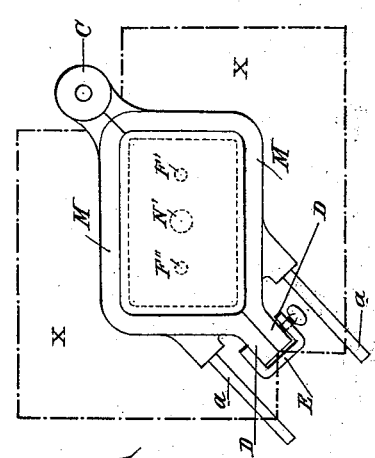
Attest:
Geo. T. Smallwood
Rewe Lewis
Inventor:
Leon Appert
by Pollok & Mauro
his attorneys.

UNITED STATES PATENT OFFICE.

LEON APPERT, OF PARIS, FRANCE.

MANUFACTURE OF HOLLOW GLASS ARTICLES.

SPECIFICATION forming part of Letters Patent No. 507,400, dated October 24, 1893.

Application filed May 24, 1893. Serial No. 475,377. (No model.)

*To all whom it may concern:*

Be it known that I, LEON APPERT, a citizen of the French Republic, residing at Paris, in the Department of the Seine, France, have invented a new and useful Improvement in the Manufacture of Hollow Glass Articles, which improvement is fully set forth in the following specification.

This invention relates to the manufacture of hollow glass articles closed at one end, according to the continuous and progressive process described in Letters-Patent No. 417,306, dated December 17, 1889.

The invention consists in certain improvements which will be described in connection with the accompanying drawings in which—

Figure 1, is a vertical sectional elevation, one corner of the mold being broken away. Fig. 2, is a plan view. Fig. 3, is a vertical section on line A B (Fig. 2). Figs. 4 and 5 are details illustrating forms of devices that may be employed for finishing the end of the article. Figs. 6 and 7 are respectively a vertical section and a side elevation. Fig. 8, is a vertical section, and Fig. 9 a plan of a modified form of apparatus.

In order to produce by the system described in the aforesaid patent, articles having bottoms all of the same thickness, it is necessary to regulate exactly the quantity of glass introduced into the mold, which is difficult to accomplish practically. By means of the present invention I am enabled to produce, at a single continuous operation, hollow articles closed at one end, and all of uniform thickness.

The invention has other utilities and advantages, as will appear from the following description.

The object above stated is effected by pouring a suitable quantity of glass into the mold upon the upper surface of the core, forming the walls progressively by moving the core slowly upward, and finally removing the excess of glass from the exterior of the article by a roller or equivalent device.

The mold M is upright and open at both top and bottom the core N''' being adapted, as in the former patent, to work upwardly in molding an article. The upper end of the mold is beveled exteriorly (as shown a M'') and brought to a comparatively narrow edge. This edge should be about from one to three millimeters in thickness, the wall of the mold being from twenty to thirty millimeters. As in my aforesaid patent the mold has a small interior groove $m'$ near its lower edge. The exterior surface of the mold is provided with ribs, or corrugations $m'$ to produce rapid cooling by increasing the extent of radiating surface exposed to the atmosphere. The mold is supported upon a table T, and is held in place by means of braces $t$ to which the mold is firmly but detachably connected by means of bolts $b$. The mold can thus be readily mounted and dismounted. Above the mold is a cylinder or roller R mounted on rails R', in such position that when rolled across the top of the mold the surface of said roller will press upon the beveled or narrow edge of the mold. This roller is, in weight and size proportioned to the dimensions and thickness of the piece to be molded, these features being varied so as to produce the degree of compression desirable in each particular case. The periphery of the roller will be of a form corresponding to that which it is desired to impart to the exterior of the bottom of the article, and it may, if desired have any suitable design in intaglio or relievo.

The core N''' is reciprocated vertically in the mold by means of the rod N'. In the beginning of the operation it is placed at the mouth of the interior of the mold, and a proper quantity of glass is poured in at the upper edge of the mold. The core then begins its ascent, progressively forming the walls of the article (which is represented in the drawings by N'') and is arrested at a determined distance beneath the upper edge of the mold. At this moment the roller R is impelled across the upper edge of the mold, shaping and compressing the bottom, or closed end of the article. The edge of the mold being made thin, as already described, the roller cuts and removes the excess of glass thus imparting to the article so made, ends of uniform thickness.

The finishing of the article may be effected by means of a hand roller R''' (Fig. 4) which may be manipulated by one or by several workmen. Or a knife (Fig. 5) may be employed or a kind of a rake formed of a blade of metal S (Figs. 6 and 7) mounted on a handle T', and used by passing it over the beveled top edge of the mold to remove the excess of glass, which being thin is easily detachable. The excess of glass may be removed by beginning in the middle and working toward the sides of the mold, as indicated in Fig. 7.

In order that the upper surface of the core N''' may be sufficiently warm not to chill the glass or destroy its malleability, and at the same time sufficiently cool to permit the glass to congeal and finish the article, the said core is at its upper end provided with a hollow chamber F, to which lead the pipes F' F'' for the purpose of maintaining through the chamber F a circulation of water or other fluid of the desired temperature. By this apparatus and mode of procedure I am enabled to produce with great rapidity and precision, and also with great uniformity of product, articles having any desired design or pattern impressed upon the exterior thereof, the corresponding design or pattern being formed upon the interior of the mold. The interior of the article may also be formed of longitudinal stripes, grooves, flutings or similar configurations, the interior of the core being made with corresponding configurations; or these interior designs or impressions may be given a spiral form by imparting to the core a movement of rotation during its ascent. Designs or patterns may thus be produced either upon the exterior or upon the interior of the molded article, or upon the exterior and interior. The mold as shown in Figs. 1 and 2 is provided (as described in the aforesaid patent) with depressions m' to retain the glass against the wall of the mold during the ascent of the core.

To facilitate the removal of the mold, it may, instead of being a single piece, be made of two like parts movable toward and away from each other by making the table T, upon which it rests also in two parts, as shown in Figs. 1, 2 and 3. The movable parts are manipulated by a screw V and a nut V', the latter being actuated by a wheel U having a crank handle, (Fig. 2.) I have shown but one of these screws, but it will be understood that two such screws may be used, being arranged symmetrically with respect to the axis of the mold. The table T has flanges T' which guide it upon its fixed support T''.

The mold M may be provided at its lower portion with a grate X, which may receive incandescent coal to maintain the temperature, or on the other hand it may contain ice to effect speedy cooling, and to keep the mold at a uniform temperature in all its parts.

Figs. 8 and 9 show a modification of the mold where, instead of a screw, a hinged movement is used to effect the opening of the mold. The mold M is in this case formed of two like parts hinged at C and manipulated by means of handles a. Each of the parts terminates in a strap D, the two faces of which are pressed and held together by means of a clamp E. The other elements of the apparatus are or may be the same as described in my patent already referred to.

Having now fully described my said invention, what I claim, and desire to secure by Letters Patent, is—

1. The method of forming hollow articles of glass closed at one end by pouring a suitable quantity of glass into the mold and upon the upper surface of the core, moving the latter slowly upward, thereby progressively forming the walls of the article, and finishing and compressing the end of the article and removing the excess glass by a transverse movement before the withdrawal of the article from the mold, substantially as described.

2. The combination of a mold for the progressive molding of glass, said mold being open at both ends and having a thin upper edge, a core working upwardly in said mold, and a roller adapted to traverse across the upper edge of the mold to cut off the excess of glass, and shape the end of the article, substantially as described.

3. The combination of a mold for the progressive molding of glass and a core working upwardly in said mold and having at its upper end a chamber provided with inlet and outlet pipes for circulating fluid to regulate the temperature of said mold, substantially as described.

4. The combination of the mold formed of two separate parts, said mold being open at both ends and having its upper edge beveled as specified, of an upwardly movable core, means for clamping the parts of the mold together during the molding and means for separating them to remove the article, substantially as described.

5. A mold for the progressive molding of articles closed at one end, said mold being open at top and bottom, and being provided with exterior ribs or corrugations, substantially as described.

In testimony whereof I have signed this specification in the presence of two subscribing witnesses.

LEON APPERT.

Witnesses:
 ROBT. M. HOOPER,
 JULES FAYOLLET.